M. H. PETIGOR & J. PARKER.
DRAFT DEVICE.
APPLICATION FILED NOV. 5, 1907.
966,353.
Patented Aug. 2, 1910.
2 SHEETS—SHEET 1.
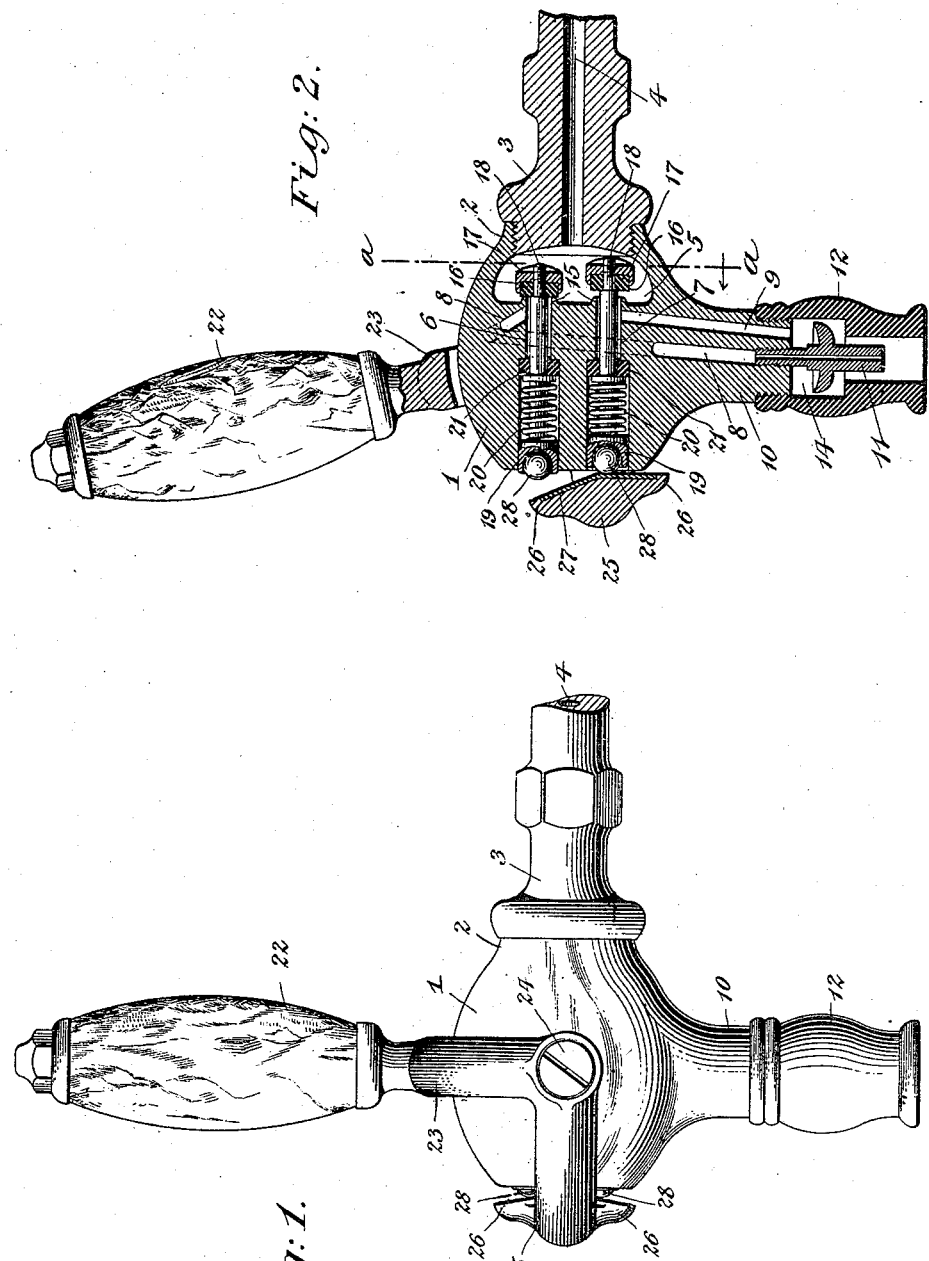
WITNESSES
John F. Rennie
P. Margulies
INVENTORS
Morris H. Petigor
and John Parker
BY
their ATTORNEY M. H. PETIGOR & J. PARKER.
DRAFT DEVICE.
APPLICATION FILED NOV. 5, 1907.
966,353.
Patented Aug. 2, 1910.
2 SHEETS—SHEET 2.
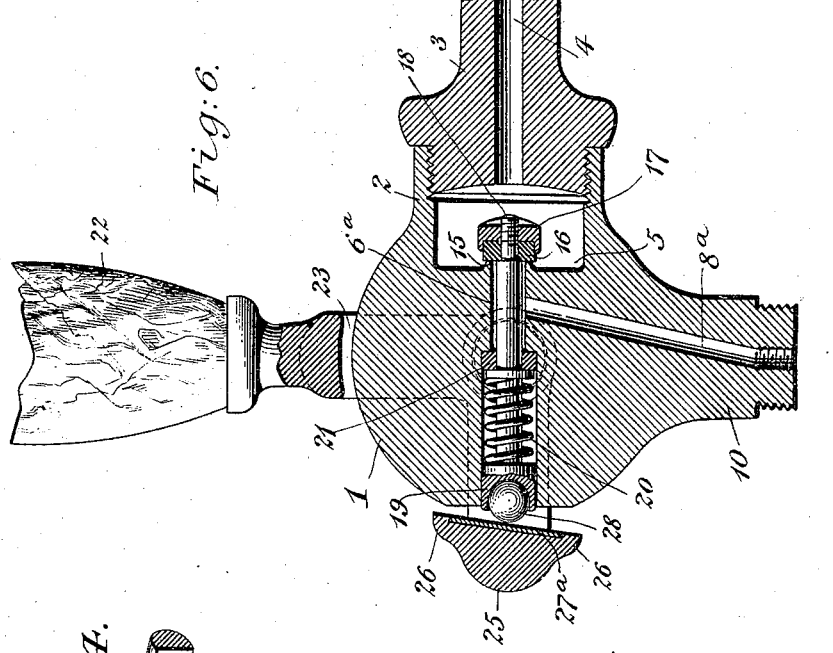
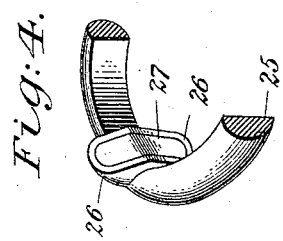
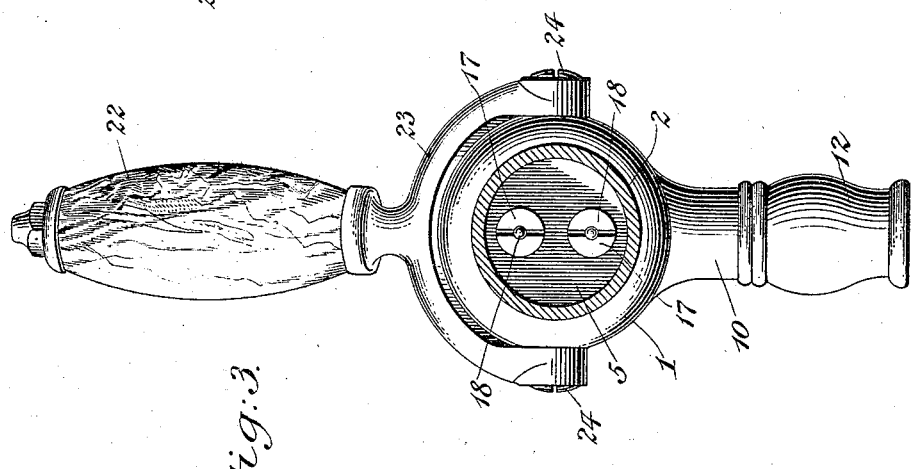
WITNESSES
John A. Rennie
S. Margulies
INVENTORS
Morris H. Petigor
and John Parker
BY
their ATTORNEY
THE NORRIS PETERS CO., WASHINGTON, D. C.

UNITED STATES PATENT OFFICE.

MORRIS H. PETIGOR AND JOHN PARKER, OF NEW YORK, N. Y.

DRAFT DEVICE.

966,353.   Specification of Letters Patent.   Patented Aug. 2, 1910.

Application filed November 5, 1907. Serial No. 400,753.

*To all whom it may concern:*

Be it known that we, MORRIS H. PETIGOR, a citizen of the United States, and JOHN PARKER, a subject of the King of Great Britain, both residing in the city and State of New York, have invented certain Improvements in Draft Devices, of which the following is a specification.

This invention relates to certain improvements in draft devices such as are employed for dispensing liquids, and more particularly in that class of such devices which are especially designed and adapted for use at soda fountains and the like for dispensing aerated waters, and the object of the invention is to provide a device of this general character of a simple and comparatively inexpensive nature and of a strong and compact construction, which shall be capable of convenient and effective use, and wherein the several parts are so combined and arranged as to lessen the liability to derangement and breakage to which such devices are commonly exposed during use.

The invention consists in certain novel features of the construction, and combinations and arrangements of the several parts of the improved draft device, whereby certain important advantages are attained and the device is rendered simpler, cheaper and otherwise better adapted and more convenient for use, all as will be hereinafter fully set forth.

The novel features of the invention will be carefully defined in the claim.

In the accompanying drawings which serve to illustrate our invention—Figure 1 is a side view of a draft device embodying our improvements; Fig. 2 is a sectional elevation taken axially through the draft device as shown in Fig. 1; Fig. 3 is a sectional view taken transversely through the improved draft device in the plane indicated by the line *a—a* in Fig. 2; Fig. 4 is a fragmentary perspective view showing a portion of the yoke of the actuating lever of the device for illustration of the valve controlling means carried thereby; Fig. 5 is a perspective view showing, detached and upon an enlarged scale, the separately formed wearing plate of the yoke of the actuating lever, and Fig. 6 is a sectional view, somewhat similar to Fig. 2, but drawn to an enlarged scale, and showing a modified arrangement of the parts of the draft device comprised in our invention.

As shown in these views, the improved draft device has a body portion 1, herein shown as in the form of a spheroidal head or piece of metal, having at one side a neck 2, which is adapted for screw connection, as clearly shown in Fig. 2, with a stem 3, whereon the draft device is supported from the casing of the fountain or other appropriate part, and which has a bore or passage 4, produced in it and adapted for the flow of the aerated fluid under pressure from the fountain to a chamber 5 produced within the neck portion of the head 1 of the device.

6 and 7 represent parallel ducts or passages extended through the head or body portion 1 from the chamber 5 to the surface of said head or body portion at the side thereof opposite to the neck 2, said ducts or passages 6 and 7 being alined with the stem 3, and being arranged, as shown in Fig. 2, one above the other and having their outer end portions which are adjacent to the surface of the head or body portion, made in increased diameter.

8 and 9 represent other ducts or passages produced within the head or body portion 1, their upper ends being in connection with the respective ducts or passages 6 and 7, and their lower end portions being extended down through a pendent reduced portion 10 of the head.

11 represents a discharge nozzle the upper end of which has screw connection with the central part of the reduced portion 10 in such a way that the aerated fluid conducted from chamber 5 by way of the ducts or passages 6 and 8 is discharged through the bore of said nozzle 11, and said bore is made in such small diameter as to permit the fluid to be discharged therefrom in a fine needle-like stream such as is commonly employed for foaming soda at fountains.

12 represents a nipple, the upper end of which has screw connection with the lower end of the reduced portion 10 of the head 1 in such a way that said nipple is caused to surround and inclose the jet nozzle 11 in a well known way, the internal diameter of said nipple 12 being so much greater than the diameter of said nozzle 11 as to afford an annular passage 14, intervening between the parts, and adapted for the free flow of the aerated liquid discharged from chamber 5 by way of the bores or passages 7 and 9, which latter communicates at its lower end with said passage 14.

There is an annular valve seat 15 produced in the chamber 5 surrounding each of the ducts or passages 6 and 7, being arranged to project from the wall of such chamber in position to be engaged by a valve 16, herein shown as formed from compressible material, and which serves, when pressed against such annular seat 15 by means to be hereinafter explained, to effectively close the corresponding duct or passage 6 or 7 against the flow of the aerated liquid from the chamber 5 to the nozzle 11 or nipple 12. The valves 16 are carried by cup-like heads or disks 17, having screw connection with the reduced inner ends of valve stems 18, 18, provided with shoulders against which said valves are securely pressed when the disks 17 are screwed in place. The valve stems 18, 18 are extended axially through the ducts or passages 6 and 7 and being of less diameter than said passages, it will be seen that free flow of the aerated liquid is permitted through said ducts or passages when the valves are moved into open position. The ends of the valve stems 18, 18 opposite to the valves 16, 16 and which are adjacent to the side of the body portion 1 at which the ducts or passages 6 and 7 open, are provided with integral enlargements 19, 19 which are of a diameter to fit snugly in the enlarged outer end portions of said ducts or passages 6 and 7, there being springs 20, 20 coiled around the respective valve stems 18, 18 in the enlarged outer portions of said ducts or passages, the outer extremities of said springs abutting against the shoulders afforded by the integral enlargements 19, 19, while their opposite or inner ends are in engagement with washers or gaskets 21, 21, held upon the valve stems 18, 18 and adapted to close communication between the inner smaller parts of the ducts or passages 6 and 7 with which the passages 8 and 9 communicate and the outer enlarged portions of said bores 6 and 7. By this arrangement it will be seen that the tension of the aerated fluid in chamber 5 is exerted to hold the valves 16, 16 normally in closed position in such a way as to effectively prevent leakage of the fluid through the passages, the springs 20, 20 being merely arranged to reinforce the tension of the aerated fluid so as to prevent possible sticking of the valves and to compensate for variations in the tension of the aerated fluid. This arrangement wherein the tension of the springs is arranged to reinforce that of the aerated fluid is very advantageous in that it serves to effectively prevent the leakage which commonly occurs where the valves are held by spring tension opposed to the tension of the aerated fluid as in various other draft devices heretofore constructed. The enlargements 19, 19 and the washers 21, 21 upon the outer ends of the valve stems 18, 18, serve to effectively center the said valve stems so as to insure proper contact of the valves upon their seats 15, and the tension of each spring 20 is exerted to hold the corresponding washer 21 tightly pressed upon the shoulder at the inner end of the outer enlarged portion of the corresponding duct or passage 6 or 7 so that leakage of the aerated fluid through the said enlarged outer portions of the said ducts or passages is effectively prevented even when the valves 16, 16 are withdrawn from their seats 15.

22 represents an actuating lever or handle having forks or bifurcations 23, pivoted at opposite sides of the head or body portion 1, as clearly shown at 24, in such a way as to hold the lever or handle for pivotal movement upon an axis transverse to the axes of the respective valve stems 18, 18 and 25 represents a curved yoke extended between the pivoted ends of the forks 23, 23 its central portion being adapted to play, when the lever is moved pivotally, transversely across the open outer ends of the ducts or passages 6 and 7 and being provided with oppositely extended projecting portions 26, 26 as shown in Figs. 2 and 4, having surfaces extended at angles to each other and adapted for contact upon balls or rolling parts 28 which are loosely held in recesses produced in the outer parts of the enlargements 19, 19 of the valves stems 18 at the outer surfaces of the spheroidal body portion.

The parts are so proportioned and arranged that when both valves 16, 16 are seated, the balls or rolling parts 28 are caused to extend beyond the outer surface of the body portion 1 as shown in Fig. 1, in such a way as to contact with the respective beveled or angular surfaces of the opposite projections 26, 26, and thereby to hold the yoke 25 in a position central between the outer ends of the valve stems, but when the actuating lever or handle is rocked in one direction or the other, one or the other of the projections 26, 26 is caused to press forcibly upon the ball 28 at the outer end of the corresponding valve stem in such a way as to press said valve stem inwardly in the body portion 1 and thereby unseat the valve 16 carried upon said stem so as to permit the flow of the aerated fluid from the chamber 5 to nozzle 11 or nipple 12. By this arrangement it will be seen that by alternately rocking lever 22 in opposite directions, the aerated fluid from chamber 5 may be first discharged from nipple 12 to fill a glass and may thereafter be discharged through the jet nozzle 11 to foam the liquid in the glass, the valves being automatically closed and the lever automatically returned to its central position by the combined tensions of the springs and of the aerated fluid chamber 5 after each such rocking movement.

The balls or rolling parts 28, 28 are preferably merely rested in the sockets provided to receive them in the enlargements at the outer or exposed ends of the valve stems, the movements of the projections 26, 26 away from said balls when the lever is rocked being insufficient to permit said balls to escape from said sockets so that accidental displacement of the balls is prevented by the engagement of the lever therewith. Since said balls, being usually formed from steel, may corrode, it is evident that this construction affords an advantage since it permits the balls to be readily replaced upon disconnection of the actuating lever from the body portion 1. Furthermore since the hardened balls 28, 28 are liable to cut into the beveled surfaces of the projections 26, 26 of the yoke 25, which latter is usually formed from soft metal, we prefer to provide said beveled surfaces with a wearing plate 27 also of steel or the like which is countersunk or inlaid in the surfaces of the projections in position for engagement with the balls. Said plate 27 is as shown in Figs. 2, 4 and 5, of angular construction and is capable of being readily replaced when worn, since no special securing means is required for holding the same in position.

The diameter and arrangement of the screw connection between the neck 2 and the supporting stem 3 are such that when the parts are disconnected, free access is afforded to the chamber 5 for adjustment or repair of the valves, the enlarged screw threaded end of said stem forming an effective closure or cover for said chamber during use of the improved draft device.

From the above description of our improvements, it will be seen that the draft device constructed according to our invention is of an extremely simple and comparatively inexpensive nature and is particularly well adapted for use by reason of the security against leakage afforded by the novel and improved construction and arrangement of the parts, and it will also be obvious from the above description that the device is susceptible of considerable modification without material departure from the principles and spirit of the invention, and for this reason we do not wish to be understood as limiting ourselves to the precise formation and arrangement of the several parts herein set forth in carrying out our invention in practice. For example in some cases, the construction shown in Fig. 6 may be desirable, there being but one valve present therein with its corresponding ducts and passages $6^a$ and $8^a$. In this construction the yoke 25 has a wearing plate $27^a$ extended at angles to the length of the valve stem and adapted, by contact against the ball 28 when the lever 22 is rocked, to move said valve stem longitudinally in the passage $6^a$ to unseat the valve 16 carried by said stem in the chamber 5.

Having thus described our invention, what we claim and desire to secure by Letters Patent is:—

A device of the character described having a body portion provided with a chamber adapted to contain fluid under pressure, and having a plurality of ducts adapted for communication therewith, valves controlling the communication of each duct with said chamber, stems operatively connected with the valves and extended parallel with each other and having recessed extremities extended outside the body portion, balls removably held in the recesses of the respective stems, and a lever pivotally mounted upon the body portion, said lever having oppositely disposed projections to contact with the balls of the respective stems, the inner faces of the projections and the alining portion of the lever being inclined in opposite directions on a straight line from the center of the alining portion of the lever away from the balls.

In witness whereof we have hereunto signed our names this 18th day of October 1907, in the presence of two subscribing witnesses.

MORRIS H. PETIGOR.
JOHN PARKER.

Witnesses:
JOSEPH A. DREWS,
HARRY MARCUS.